United States Patent
Wang (10) Patent No.: US 10,573,099 B2
(45) Date of Patent: Feb. 25, 2020

(54) VEHICLE PART RELIABILITY DETERMINATION SYSTEM AND METHOD

(71) Applicant: THE BOEING COMPANY, Chicago, IL (US)

(72) Inventor: Zhennong Wang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 295 days.

(21) Appl. No.: 15/604,713

(22) Filed: May 25, 2017

(65) Prior Publication Data
US 2018/0342116 A1 Nov. 29, 2018

(51) Int. Cl.
G06F 7/70 (2006.01)
G07C 5/08 (2006.01)
G06Q 10/00 (2012.01)

(52) U.S. Cl.
CPC .......... G07C 5/0808 (2013.01); G06Q 10/20 (2013.01)

(58) Field of Classification Search
None
See application file for complete search history.

(56) References Cited

U.S. PATENT DOCUMENTS

| 5,210,704 A | 5/1993 | Husseiny |
| 6,490,543 B1 * | 12/2002 | Jaw ............... G05B 19/4065 340/457.4 |
| 2015/0051786 A1 | 2/2015 | Wang |
| 2015/0234951 A1 * | 8/2015 | Andersson ............ G06F 17/18 703/2 |
| 2017/0073936 A1 * | 3/2017 | Johnson ................. E02F 9/267 |

OTHER PUBLICATIONS

Extended European Search Report for EP 18164776.9-1222, dated Jun. 6, 2018.

* cited by examiner

*Primary Examiner* — Adam M Alharbi
(74) *Attorney, Agent, or Firm* — Joseph M. Butscher; The Small Patent Law Group, LLC (57) ABSTRACT

A part reliability determination system and method are used to determine a reliability of at least one part of a vehicle. The reliability determination system and method include a part life prediction control unit that determines a remaining life of the part(s) based on current life data of the part(s) in relation to a part life distribution related to the part(s).

20 Claims, 4 Drawing Sheets

VEHICLE PART RELIABILITY DETERMINATION SYSTEM AND METHOD

FIELD OF THE DISCLOSURE

Embodiments of the present disclosure generally relate to systems and methods for determining reliability of various parts of a vehicle, such as an aircraft.

BACKGROUND OF THE DISCLOSURE

Vehicles are used to transport individuals between locations. For example, commercial aircraft are used to transport passengers between various locations. A typical aircraft includes thousands, if not millions, of component parts. For example, each system, sub-system, structure, and the like of an aircraft may be formed from thousands of component parts.

As can be appreciated, aircraft operators and passengers value flights that are on time. Maintenance operations pose a potential delay for aircraft. For example, if it is determined that a particular part of an aircraft needs to be replaced between flights, a maintenance crew replaces the part. However, such maintenance procedures may cause the ensuing departure time to be delayed while the old part is replaced with a new part.

SUMMARY OF THE DISCLOSURE

A need exists for a system and method of assessing reliability of parts of a vehicle, such as an aircraft. Further, a need exists for a system and method of determining a remaining life of parts of an aircraft. Also, a need exists for a system and method of determining times to replace parts of an aircraft in order to avoid flight delays that may otherwise occur due to maintenance operations between flights.

With those needs in mind, certain embodiments of the present disclosure provide a part reliability determination system that is configured to determine a reliability of at least one part of a vehicle. The part reliability determination system includes a part life prediction control unit that determines a remaining life of the part(s) based on current life data of the part(s) in relation to a part life distribution related to the part(s).

In at least one embodiment, the system includes a part life distribution control unit. The part life distribution control unit determines the part life distribution related to the at least one part.

The system may include a parts database in communication with the part life prediction control unit. The current life data of the part(s) may be stored in the parts database. Historical part data regarding the part(s) may be stored in the parts database.

In at least one embodiment, a vehicle usage database stores vehicle usage data regarding actual use of the vehicle. The part life prediction control unit determines the remaining life in relation to the vehicle usage data.

The current life data may include one or both of time since installation or cycles since installation.

In at least one embodiment, the part life prediction control unit determines the remaining life based, at least in part, on a prior replacement time of at least one prior part. The part life distribution control unit may build a chain of part installation times and part removal times. The part life distribution unit may use the chain to determine how long the part(s) has been used, and/or the remaining life of the part(s).

The part life prediction control unit may analyze vehicle configuration data to determine the presence and number of the part(s).

In at least one embodiment, the part life prediction control unit determines a time since installation or a cycles since installation for the part(s) based, at least in part, on a part number or serial number of the part(s).

In at least one embodiment, the part life prediction control unit determines the remaining life of the part(s) through a determination of one or both of a time the since the part(s) was installed or cycles since the part(s) was installed in relation to one or more mathematical models.

Certain embodiments of the present disclosure provide a part reliability determination method that is configured to determine a reliability of at least one part of a vehicle. The part reliability determination method includes determining, by a part life prediction control unit, a remaining life of the part(s) based on current life data of the part(s) in relation to a part life distribution related to the part(s).

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems and methods that are configured to determine life expectancy of various parts of a vehicle, such as an aircraft. Knowledge of vehicle part life has various advantages, including an ability to provide improved vehicle design, efficient support of vehicle operation, the ability to predict component removal times, the ability to determine a number of spare parts to have on hand, and support of maintenance checks.

Certain embodiments of the present disclosure provide systems and methods of determining reliability of components of a vehicle, such as an aircraft. The systems and methods determine part life distribution. After the part life distribution is determined, the systems and methods are able to determine reliability and remaining life of the various parts of the vehicle. For example, the systems and methods are able to determine how long a part will last, an average life of a part, when a part may be susceptible to failure, risk associated with an existing part remaining on a vehicle, and a number of spare parts an aircraft operator needs for a predetermined time period.

Reliability in relation to a part relates to the probability that the part will perform its intended function without failing for a stated period of time. The systems and methods described herein assess the reliability of one or more parts of a vehicle in order to predict when the part(s) should be replaced before a potential failure.

In at least one embodiment, a part reliability determination system collects and stores flight hours and flight cycles during which parts have been in service. The flight hours and flight cycles are stored as usage data within a vehicle usage database. The part reliability determination system may, for each part, store a time since the part was installed (TSI), and the number of cycles (in which a cycle is measured as a departure to arrival of a vehicle) since the part was installed (CSI). However, TSI/CSI may not be directly available in part removal data. For example, operators may not be required to provide TSI/CSI when a part is removed from an aircraft. Accordingly, embodiments of the present disclosure provide a part reliability determination system that is configured to determine TSI and CSI for removed parts.

In at least one embodiment, the part reliability determination system is also configured to determine censored data, namely TSI and CSI for parts that are currently on a vehicle, such as an aircraft. In order to determine the censored data, the part reliability determination system retrieves vehicle configuration data and vehicle readiness log data, which may be stored in a vehicle usage database. By analyzing the vehicle configuration data and vehicle readiness log data and component removals, the part reliability determination system determines how many of parts with the same part numbers have been removed and how many of them are still on the vehicle. By determining part removals, the part reliability determination system determines when a part was installed and how long the component has been on the vehicle.

Embodiments of the present disclosure provide systems and methods that integrate data sources and estimate TSI/CSI from both removed parts and parts that are still on aircrafts. The systems and methods are configured to predict when parts of a vehicle are susceptible to failure based on aircraft part life distribution. By predicting when a part is susceptible to failure, the systems and methods allow for the part to be replaced before such predicted time.

Figure 1:
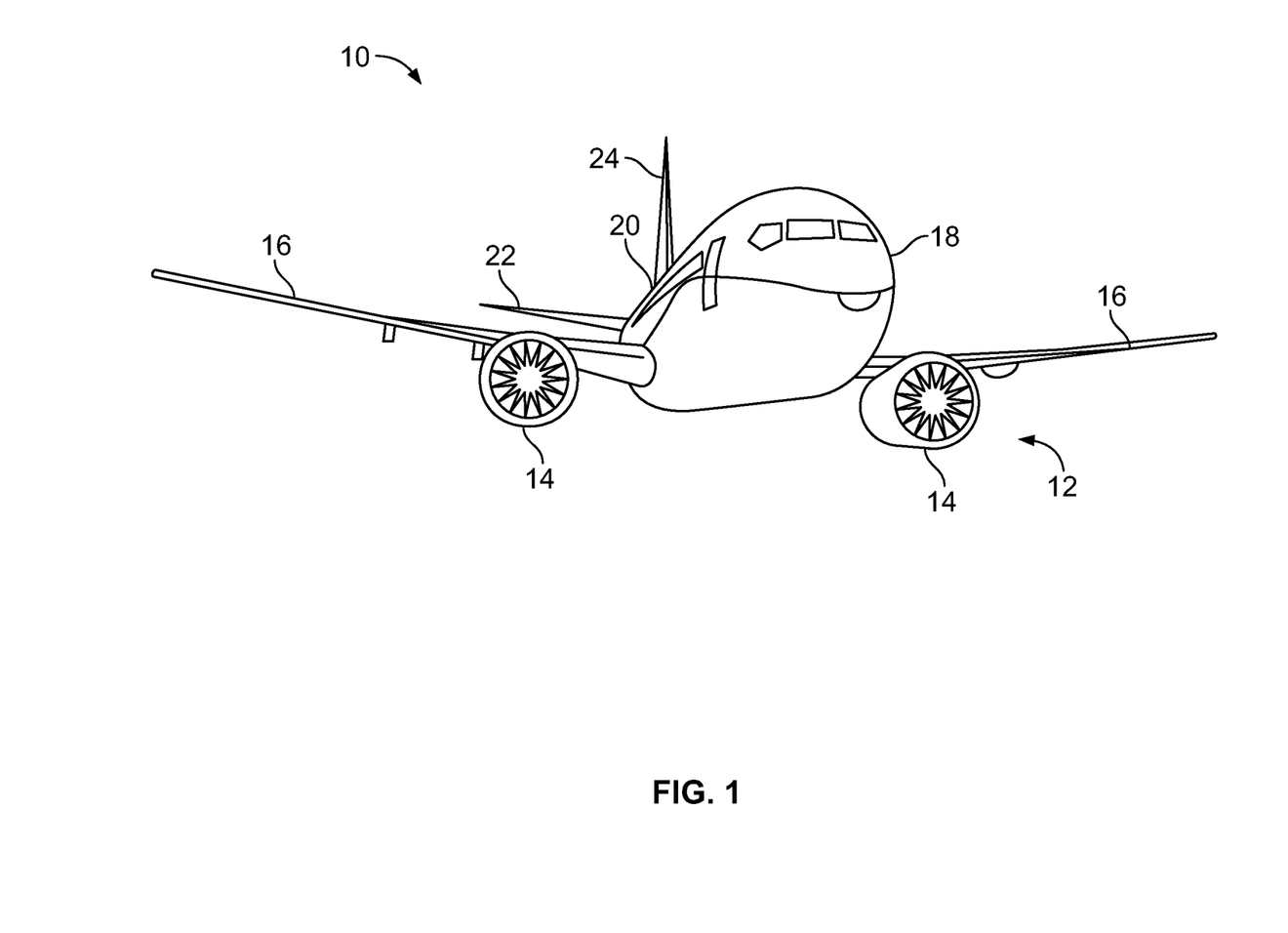
FIG. 1 is a diagrammatic representation of a front perspective view of an aircraft, according to an exemplary embodiment of the present disclosure.

FIG. 1 is a diagrammatic representation of a front perspective view of a vehicle, such as an aircraft 10, according to an exemplary embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and economy sections), and an aft section. Each of the sections may be separated by a cabin transition area, which may include one or more class divider assemblies. Overhead stowage bin assemblies may be positioned throughout the interior cabin.

The aircraft 10 includes numerous systems and subsystems that include numerous parts. For example, the propulsion system 12 includes thousands of component parts. As another example, each lavatory onboard the aircraft 10 includes thousands of component parts. The entire aircraft 10 includes millions of separate and distinct parts that together form the aircraft 10. A part reliability determination system is used to determine a life distribution for each of the parts, and predict a remaining life (for example, time until the part may be susceptible to failing) for the parts of the aircraft 10. In at least one embodiment, the part reliability determination system determines the remaining life in relation to flight hours and/or flight cycles of the aircraft 10.

Alternatively, instead of an aircraft, embodiments of the present disclosure may be used with various other vehicles, such as automobiles, buses, locomotives and train cars, seacraft, spacecraft, and the like.

Figure 2:
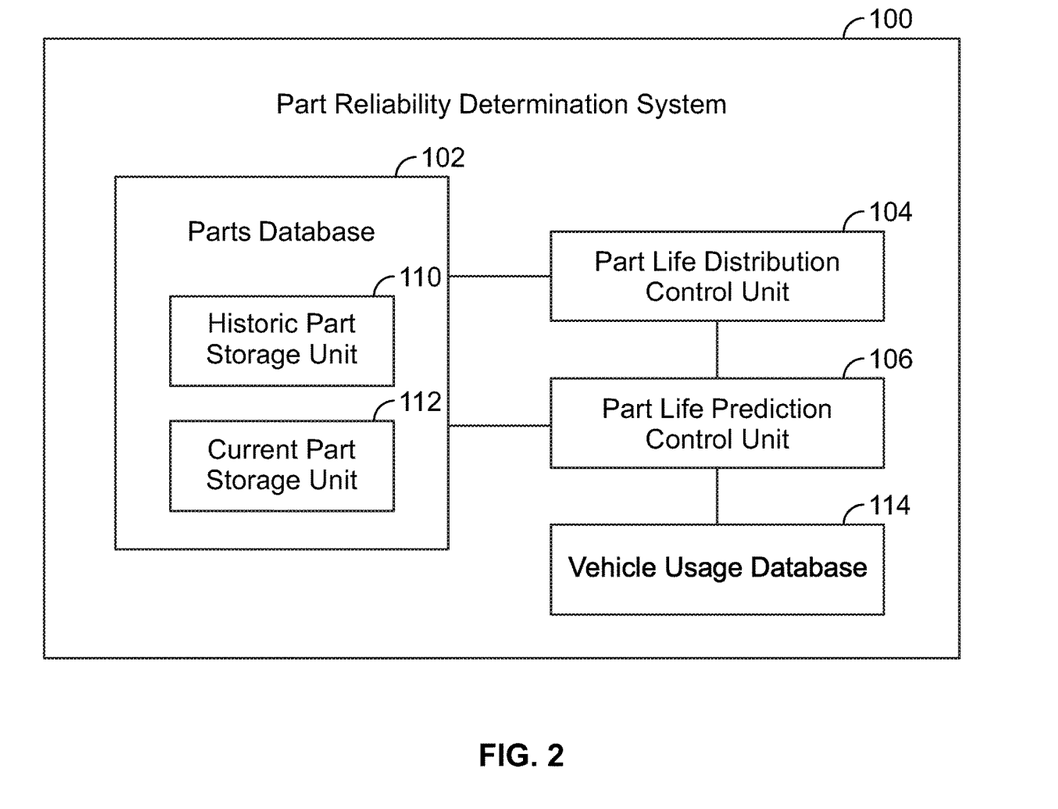
FIG. 2 is a schematic representation of a part reliability determination system, according to an exemplary embodiment of the present disclosure.

FIG. 2 is a schematic representation of a part reliability determination system 100, according to an exemplary embodiment of the present disclosure. The part reliability determination system 100 includes a parts database 102 that is in communication with a part life distribution control unit 104, and a part life prediction control unit 106, such as through one or more wired or wireless connections. The part life distribution control unit 104 and the part life prediction control unit 106 are also in communication with one another, such as through one or more wired or wireless connections.

The part reliability determination system 100 may be onboard the aircraft 10 (shown in FIG. 1), for example. Optionally, the part reliability determination system 100 may be remotely located from the aircraft 10, such as at a land-based monitoring station. In at least one embodiment, one or both of the part life distribution control unit 104 or the part life prediction control unit 106 may be onboard the aircraft 10, while the parts database 102 is remotely located therefrom, such as at a land-based monitoring station. In at least one embodiment, the parts life distribution control unit 104 and the part life prediction control unit 106 may be in communication with the parts database 102 through various communication networks, such as, but not limited to, the Internet.

As shown, the part life distribution control unit 104 and the part life prediction control unit 106 may be separate and distinct control units. Optionally, the part life distribution control unit 104 and the part life prediction control unit 106 may be components of a single control unit or processing system.

In at least one embodiment, the parts database 102 includes a historic part storage unit 110, and a current part storage unit 112. The historic part storage unit 110 stores data for all type of parts of the aircraft complied over time for numerous aircraft. For example, the historic part storage unit 110 may store data regarding the useful life of all parts currently on an aircraft but aggregated for past uses with respect to the aircraft and various other aircraft (for example, other same-molded aircraft). The data may include life data (that is, the time of actual usage) for each of the parts. In at least one embodiment, the historic part storage unit 110 stores all available data for the parts currently on the aircraft, but which have been used with respect to the current aircraft and all other aircraft for which such data is available.

As an example, the aircraft includes a particular part. The historic part storage unit 110 stores available data for the same type of particular part, but which has been previously used with respect to the aircraft, and the various other aircraft for which data is available. As such, the historic part storage unit 110 may store data for a particular part used in connection with hundreds, thousands, or more aircraft.

The current part storage unit 112 stores current life data for all parts currently on the aircraft. For example, the current part storage unit 112 stores data regarding time since each part was installed (TSI), cycles since each part was installed (CSI), and the like. In this manner, the current part storage unit 112 stores current life data regarding the actual usage (that is, life) of each part.

In at least one embodiment, the part reliability determination system 100 also includes a vehicle usage database 114 that stores vehicle usage data indicative of the actual usage of a vehicle having the parts. The vehicle usage database 114 is in communication with the part life prediction control unit 106, such as through one or more wired or wireless connections. As an example, the vehicle usage database 114 stores vehicle usage data for an aircraft, such as in terms of flight hours (that is, actual hours of in-flight operation) and flight cycles (that is, total number of cycles, in which a cycle is defined as a departure and associated arrival).

The part life prediction control unit 106 is configured to determine a remaining life of a part of a vehicle based on a part life distribution of the particular type of part, as determined by the part life distribution control unit 104, the vehicle usage (as stored as vehicle usage database 114), and a remaining life of a part, as determined by the part life prediction control unit 106. As such, the part life prediction control unit 106 is configured to determine the remaining life of the part based on current life data regarding the part (such as stored in the current part storage unit 112) and the part life distribution related to the part, as determined by the part life distribution control unit 104. In at least one embodiment, the part life prediction control unit 106 determines the remaining life of a part as a function of the determined part life distribution of the particular type of part and the actual usage of the vehicle. For example, the part life prediction control unit 106 may determine a remaining life of a current part of an aircraft in terms of flight hours and/or flight cycles of an aircraft.

In operation, the part life distribution control unit 104 analyzes the historic part data for each part stored in the historic part storage unit 110. The part life distribution control unit 104 determines a life distribution for a particular part based on the historic part data, which, as noted, may be compiled with respect to uses in relation to thousands or more aircraft. In at least one embodiment, the part life distribution control unit 104 determines a life distribution for a particular type of part based on analysis of the historic part data. In at least one embodiment, the part life distribution control unit 104 may determine the life distribution based on one or more mathematical models and formulas.

As but one example, the part life distribution control unit 104 may determine an average life of a particular type of part based on historical data regarding hundred, thousands, or millions of actual lives (that is, times of actual use of a particular part) of the particular type of part. For example, the part life distribution control unit 104 may be based on hundreds, thousands, or even millions of actual life usages of prior parts. As such, the part life distribution control unit 104 determines a part life distribution for a particular type of part. In at least one embodiment, the part life distribution control unit 104 determines a part life distribution for each particular type of part of an aircraft. In at least one other embodiment, the part life distribution control unit 104 determines a part life distribution for less than each particular type of part of an aircraft.

After determining a part life distribution for a particular type of part of an aircraft, the part life prediction control unit 106 analyzes the current part data of the aircraft, which is stored in the current part storage unit 112. The part life prediction control unit 106 assesses the various current parts (that is, the parts that currently form one or more portions) of the aircraft, as stored in the current part data. For example, the current part data stores the TSI, CSI, and/or the like for the current parts. The TSI and CSI for each part may be provided and stored in the current part storage unit 112. In at least one other embodiment, the TSI and CSI may not be provided. Instead, the part life prediction control unit 106 may determine the TSI and CSI based on dates of prior part removals, statistical analysis of installation and removal dates of parts, and/or the like. The part life prediction control unit 106 analyzes the part life distribution for each type of part (as determined by the part life distribution control unit 104) in relation to each current part of the aircraft to predict a remaining life of the current parts.

In at least one embodiment, the part life prediction control unit 106 determines a current life of a part based on vehicle usage data stored in the vehicle usage database 114. For example, the part life prediction control unit 106 correlates the TSI and/or CSI of a part and cross-references such current life data with vehicle usage data stored in the vehicle usage database 114. Based on the TSI and/or CSI and the actual vehicle usage (in terms of hours and/or cycles), the part life prediction control unit 106 determines a current life of a part in terms of vehicle hours of usage and/or cycles. The part life prediction control unit 106 may then compare the current life of the part in relation to the part life distribution for that particular type of part to predict a remaining life of the part, such as in terms of remaining hours and/or cycles.

As an example, a vacuum generator for a lavatory onboard the aircraft is one type of part. The part life distribution control unit 104 analyzes the historic data for vacuum generators that is stored in the historic part storage unit 110. Based on the historic data for vacuum generators, the part life distribution control unit 104 determines a part life distribution for vacuum generators. For example, the part life distribution control unit 104 may determine an average useful life for a vacuum generator based on the historic data for vacuum generators stored in the historic part storage unit 110. The part life prediction control unit 106 then analyzes the current part storage unit 112 and confirms that a vacuum generator is onboard the aircraft. The current part storage unit 112 stores current data for the vacuum generator. The current data includes the TSI, for example, for the vacuum generator onboard the aircraft. The part life prediction control unit 106 then correlates the part life distribution for vacuum generators (as determined by the part life distribution control unit 104) with the current life data for the vacuum generator onboard the aircraft. Based on the correlation between the part life distribution for vacuum generators and the current data for the actual vacuum generator onboard the aircraft, the part life prediction control unit 106 predicts a remaining useful life for the actual vacuum generator. As an example, the part life prediction control unit 106 subtracts the time of use of the actual vacuum generator (for example, flight hours elapsed from TSI until current date) from the part life distribution for vacuum generators. In this manner, the part life prediction control unit 106 predicts when the actual vacuum generator may be susceptible to failure. The part life prediction control unit 106 then outputs a prediction signal indicative of the predicted time to a flight operator, maintenance crew, or the like, so that a planned time of replacement may be determined.

The part reliability determination system 100 operates in such a manner for at least one part of the aircraft. In at least one embodiment, the part reliability determination system 100 determines a part life distribution and predicts a remaining useful life for each and every part of the aircraft.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the part life distribution control unit 104 and the part life prediction control unit 106 may be or include one or more processors that are configured to control operation of the part reliability determination system 100, as described herein. The part life distribution control unit 104 and the part life prediction control unit 106 may be separate and distinct control units, or may be part of the same control unit.

The part life distribution control unit 104 and the part life prediction control unit 106 are configured to execute a set of instructions that are stored in one or more data storage units or elements (such as one or more memories), in order to process data. For example, the part life distribution control unit 104 and the part life prediction control unit 106 may include or be coupled to one or more memories. The data storage units may also store data or other information as desired or needed. The data storage units may be in the form of an information source or a physical memory element within a processing machine.

The set of instructions may include various commands that instruct the part life distribution control unit 104 and the part life prediction control unit 106 as processing machines to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the part life distribution control unit 104 and the part life prediction control unit 106. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the part life distribution control unit 104 and the part life prediction control unit 106 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
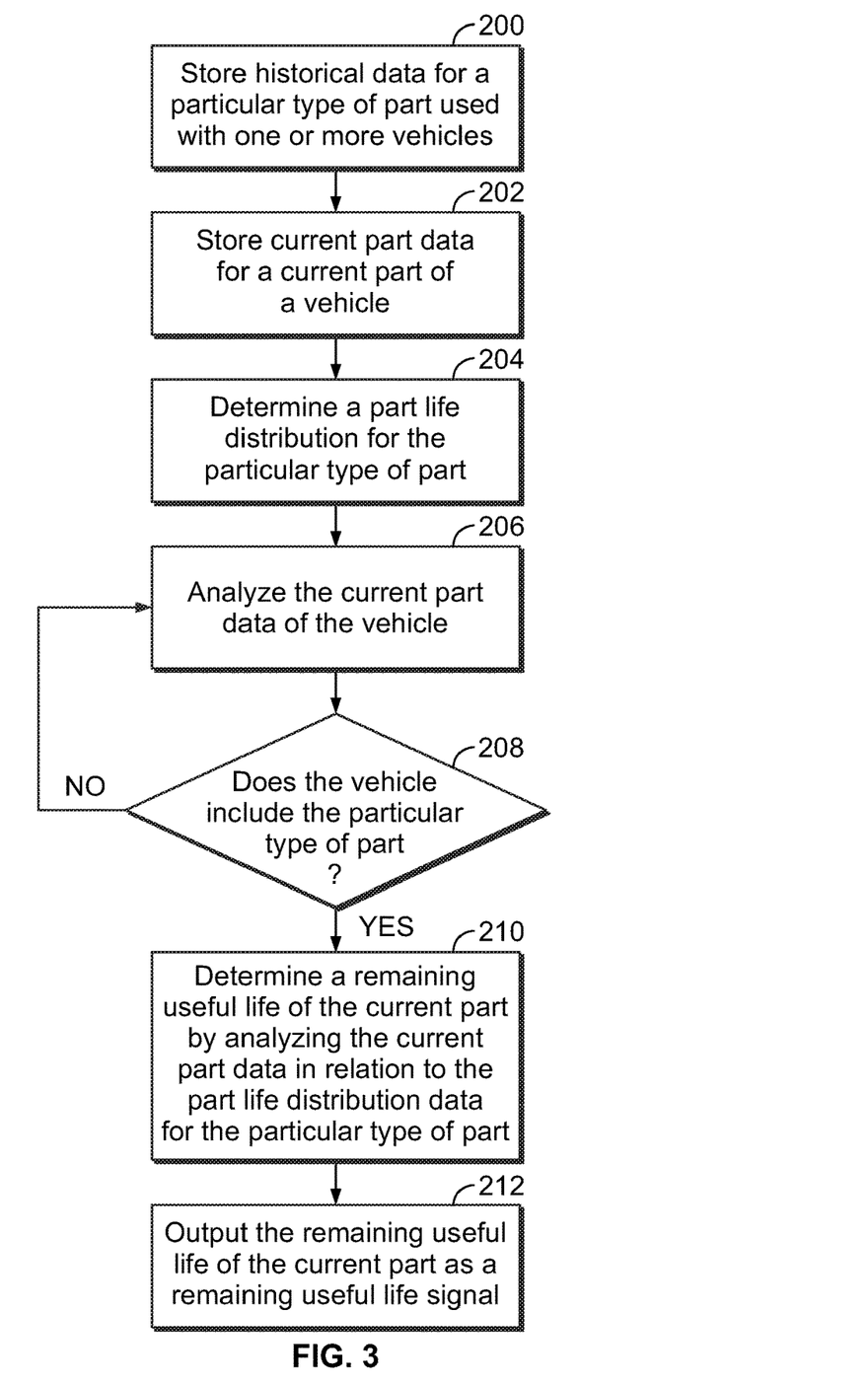
FIG. 3 is a flow chart of a method of determining part reliability, according to an exemplary embodiment of the present disclosure.

FIG. 3 is a flow chart of a method of determining part reliability, according to an exemplary embodiment of the present disclosure. Referring to FIGS. 2 and 3, at 200, historical data for a particular type of part used with one or more vehicles is stored, such as in the historic part storage unit 110 of the parts database 102. At 202, current part data for a current (that is, currently forming a portion) of a vehicle is stored, such as in the current part storage unit 112 of the parts database 102.

A 204, a part life distribution for the particular type of part is determined, such as by the part life distribution control unit 104. At 206, the current part data of the vehicle is analyzed, such as by the part life prediction control unit 106. At 208, it is determined whether the vehicle includes the particular type of part. If the vehicle does not include the particular type of part, the method returns to 206 (or alternatively, ends). If, however, the vehicle does include the particular type of part at 208, the method proceeds to 210, at which a remaining useful life of the current part is determined by the part life prediction control unit 106. For example, the part life prediction control unit 106 analyzes the current part data (which is indicative of a current lifetime of the current part) in relation to the part life distribution data for the particular type of part to predict a remaining useful life of the current part.

At 212, the part life prediction control unit 106 outputs the remaining useful life of the current part as a remaining useful life signal. The remaining useful life signal may include one or more of a graphical, video, text, and/or audio signal that communicates the remaining useful life of the current part to an individual.

In at least one embodiment, the remaining useful life signal may be communicated based on predetermined thresholds. For example, the part life prediction control unit 106 may only output the remaining useful life signal when the remaining useful life of the current part is within a predetermined time and/or predetermined cycle (such as a percentage thereof) until being susceptible to failure. In this manner, the part life prediction control unit 106 is able to proactively alert individuals (such as aircraft operators, maintenance personnel, and the like) to required replacements. The method shown in FIG. 3 may be performed for each and every part of a vehicle (or any subset thereof).

Referring again to FIG. 2, in order to determine a current lifetime of a part, the part life prediction control unit 106 may first determine TSI and/or CSI for the part. The installation date for a particular part, as well as a removal date for an immediately preceding part that was replaced by the particular part are stored in the current part storage unit 112. However, data regarding a particular installation or removal may not be readily available. As described below, the part reliability determination system 100 may be configured to determine installation and removal dates, even when such information is not initially reported or otherwise provided by an aircraft operator, manufacturer, or the like. After TSI and CSI data is determined, the part life prediction control unit 106 may utilize one or more mathematical models (for example, a Weibull model, an exponential model, a gamma model, or a log normal model) to predict a remaining life of a part.

The parts life prediction control unit 106 integrates part removals that are known (such as reported and stored in the historic part storage unit 110), aircraft configuration data (such as indicating the various parts of the aircraft), part interchangeability data, and aircraft utilization data (for example, flight hours and/or flight cycles), which may be stored in memory and/or at a central monitoring station.

In at least one embodiment, in order to determine remaining part life, the part life prediction control unit 106 retrieves data regarding when part tracking first occurred. Such data may be stored in the historic part storage unit 110 and/or the current part storage unit 112.

In at least one embodiment, the part life prediction control unit 106 builds a chain that links installations and removals of a particular type of part. In doing so, the part life prediction control unit 106 determines an overall utilization of the part. For example, if the particular type of part was removed and installed five times over a particular time period, the part life prediction control unit 106 is able to determine an average useful life of the part via the number of replacements over the particular time period.

In some situations, the part life prediction control unit 106 may not be able to access reported dates of removal and installation. As such, the part life prediction control unit 106 may be unable to construct a chain that links installations and removals.

In at least one embodiment, when the quantity of the part per aircraft (QPA) equals 1 (that is, there is only one of such part on the aircraft), part utilization may be determined from the date of last removal. For example, based on the date the particular part was last removed, the part life prediction control unit 106 may determine a remaining useful life of the current part (which replaced the removed part) based on the previous removal date, as well as the part life distribution of the part, as determined by the part life distribution control unit 104.

If the quantity of part per aircraft (QPA) for the particular type of part is greater than 1 (that is, there are more than one of such part on the aircraft), and there are no observed removals (for example, no stored dates of removal in the parts database 102), the part life prediction control unit 106 may determine each last removal of a part number with QPA>1 and may determine the utilization from one last removal to the end of a study for each part with the same part number. For example, the part life prediction control unit 106 may determine the last three known removals of a particular type of part. The part life prediction control unit 106 may also determine utilization of the parts from the time or cycle of the most recent removal to an end of a relevant study period.

In at least one embodiment, the part life prediction control unit 106 determines a number (n) of removals and QPA (m>1) of a part number. In such an m>n case, the part life prediction control unit 106 determines the utilization of parts for m-n parts. In at least one embodiment, the part life prediction control unit 106 determines which parts are flight hours associated and which parts are flight cycles associated, and uses flight hours to estimate part life if flight hours related, and flight cycles to estimate part life if flight cycles associated.

The current part data stored in the current part storage unit 112 may include one or both of TSI and CSI for a current part, as reported by a manufacturer or aircraft operator, for example. That is, a known first date and/or known first cycle of use of the part may be input into the current part storage unit 112.

The part life distribution control unit 104 and/or the part life prediction control unit 106 detects vehicle configuration and quantity (for example, QPA) for a part from vehicle engineering configuration data, aircraft readiness log data, IPC (illustrated part catalog), and/or the like, which may be stored in the current part storage unit 112 and/or the vehicle usage database 114.

For a situation in which there is only one type of particular part onboard the aircraft (such as an aircraft including a single vacuum generator), such that the QPA=1, the part life prediction control unit 106 is able to determine when the part is removed. In at least one embodiment, the part life prediction control unit 106 detects a removal sequence of parts with the same part number on an aircraft.

The part life prediction control unit 106 may determine a TSI or a CSI for a part based, at least in part, on the part number or serial number of the part. In at least one embodiment, the part life prediction control unit 106 is configured to detect when the part number began to be tracked. For example, the date of first tracking of the part may be a portion of the current part data stored in the current part storage unit 112. Further, the part life prediction control unit 106 analyzes the flight hours/cycles of the aircraft, such as stored in the vehicle usage database 114. Accordingly, the part life prediction control unit 106 may then detect the flight hours/cycles at the time when a part was removed from the aircraft. The part life prediction control unit then calculates TSI and/or CSI for the removed part. The part life prediction control unit 106 then identifies when a part that replaced (that is, the replacement part) the removed part is installed on the aircraft. The part life prediction control unit 106 then monitors the flight times and cycles for the replacement part.

In at least one embodiment, the part life prediction control unit 106 detects all other parts of the aircraft with QPA=1 that have not been reported as removed, but which there have been reported removal of the same part number from a different aircraft. The part life distribution control unit 104 and/or the part life prediction control unit 106 may then detect how many other aircraft have the same part number.

In at least one embodiment, the part reliability determination system 100 (such as through one or both of the part life distribution control unit 104 and/or the part life prediction control unit 106) detects when removals for the part number initially started being reported. The flight hours/cycles of each aircraft are then determined for the times when part removals first started being reported.

If QPA for a part onboard an aircraft exceeds 1, the part life prediction control unit 106 constructs a chain of removed and installed parts, such as in conjunction with their serial numbers. The part life prediction control unit 106 may identify a part in the chain. Next, it is determined when the part was installed on the aircraft and when the part was removed from the aircraft. Such information may be stored in the historic part storage unit 110. Next, the flight hours/cycles when the part was installed and the flight hours/cycles when the part was removed are stored in the historic part storage unit 110. Then, the part life prediction control unit 106 calculates one or both of TSI and/or CSI of the part. The part life prediction control unit 106 identifies the installation date and the removal date for a removed part, both of which may be stored in the historic part storage unit 110 and/or the current part storage unit 112. Again, the part life prediction control unit 106 may then identify the flight hours and/or cycles of the aircraft at the time when the part was installed and flight hours and/or cycles of the aircraft at the time when the part was removed.

In at least one embodiment, the part reliability determination system 100 is configured to identify removed parts with blank serial numbers and/or removed parts without installed part information. The part life distribution control unit 104 and/or the part life prediction control unit 106 first identifies all removed parts with the same part number. Then, the first removal(s) of parts with the same part number are identified. Next, dates when removals were first reported for the part number are identified. Next, the later of the aircraft delivery date (that is, when first delivered to an aircraft operator) and/or the date when removals were first reported is then identified. Then, the flight hours/cycles of the aircraft at the date that is later are identified. For example, the aircraft may have been delivered on Date 1, while removal of particular parts was reported on Date 2, which is after Date 1. Thus, the date when removals were first reported (that is, Date 2) is later than the date when the aircraft was delivered (that is, Date 1). The flight hours/cycles of the aircraft are then identified from Date 2. After the flight hours/cycles of the aircraft at the date that is later are identified, a part removal data is identified.

The part reliability determination system 100 may also identify the last removal(s) with the same part numbers. The date(s) of removal(s) is correlated with the flight hours and/or cycles of the aircraft. The TSI and/or CSI is then calculated for the parts that are still on the aircraft.

The system 100 may also identify all removals with the same part number and count the number (m) of removals for the parts. The system 100 identifies QPA (n) for the parts. The system 100 then detects parts with m>n. The system 100 then determines the later of the delivery date of the aircraft and the date when removals started being reported. The system 100 then calculates TSI and/or CSI for the part (in which m>n).

In at least one embodiment, the part life prediction control unit 106 calculates mean and standard deviation of TSI and mean and standard deviation of CSI for each part number. The part life prediction control unit 106 compares a normalized standard deviation of TSI and CSI separately, and determines if the part is associated with flight hours or flight cycles.

As indicated, the part life prediction control unit 106 may utilize one or more mathematical models to determine a remaining life of a part. For example, the part life prediction control unit 106 may determine a remaining life of a part through use of a Weibull model, as shown below:

$$pdf\ f(t) = \begin{cases} \frac{\beta}{\alpha}\left(\frac{t}{\alpha}\right)^{(\beta-1)} e^{-\left(\frac{t}{\alpha}\right)^\beta} & t \geq 0 \\ 0 & t < 0 \end{cases}$$

where pdf is a probability distribution function, $\alpha$ is a scale parameter that may be defined by one or both of a TSI or CSI for the part, and $\beta$ is a shape parameter that may be defined by one of both of the TSI or CSI for the part. When $\beta=1$, the Weibull model becomes an exponential model.

A time dependent failure rate, h, is given by $$h = \frac{\beta}{\alpha}\left(\frac{t}{\alpha}\right)^{(\beta-1)}.$$

A cumulative distribution function (CDF), F(t), is given by $$F(t) = 1 - e^{-\left(\frac{t}{\alpha}\right)^\beta}\ t >= 0.$$

A Reliability function, R(t), is given by $$R(t) = e^{-\left(\frac{t}{\alpha}\right)^\beta}.$$

$\alpha$ is a scale parameter. $\beta$ is a shape parameter. When $\beta=1$, the Weibull model is the exponential model.

Figure 4:
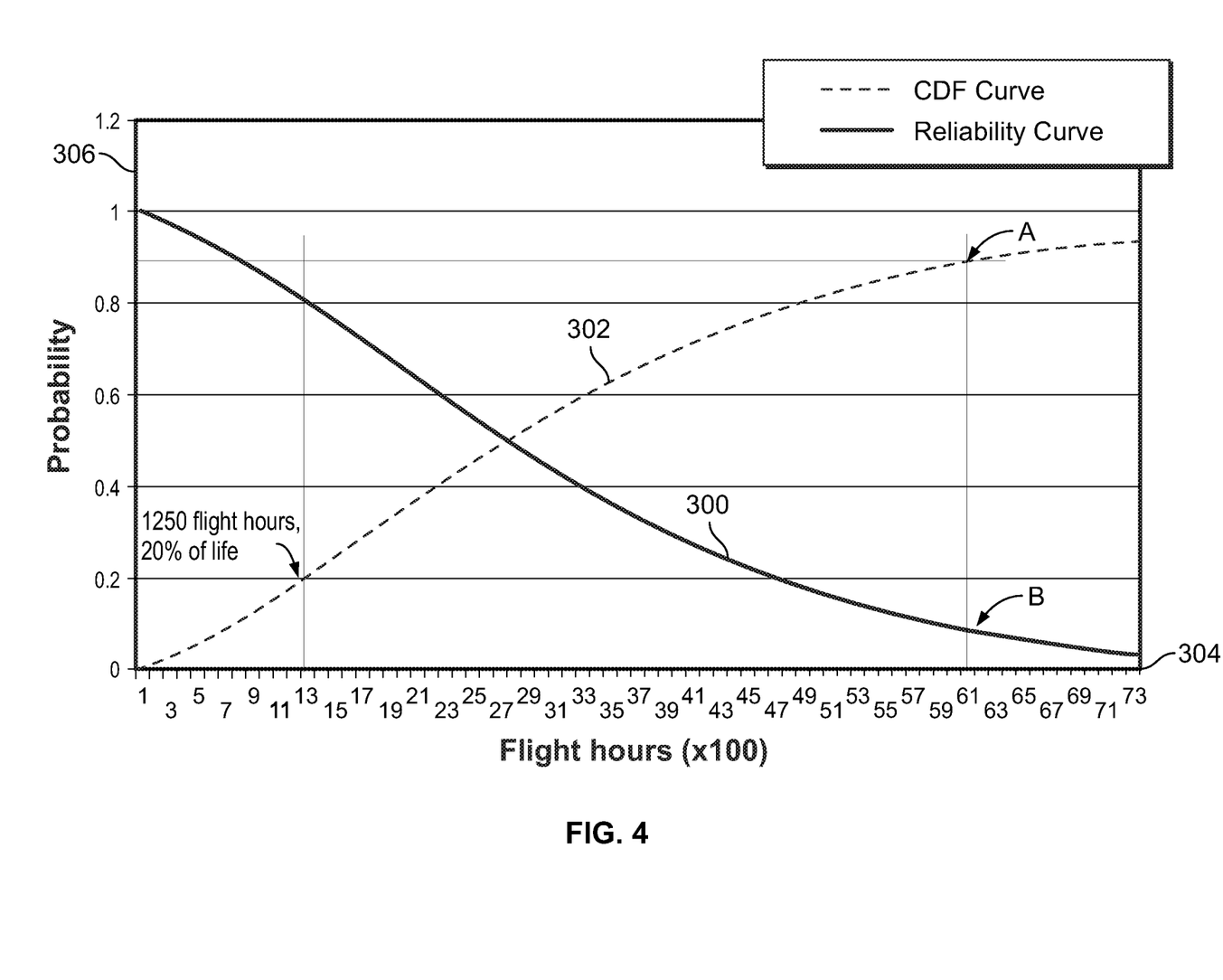
FIG. 4 is a diagrammatic representation of a graph of a reliability curve and a cumulative distribution function curve, according to an exemplary embodiment of the present disclosure.

FIG. 4 is a diagrammatic representation of a graph of a reliability curve 300 and a CDF curve 302, according to an exemplary embodiment of the present disclosure. The part life prediction control unit 106 determines the curves 300 and 302 via a mathematical model, such as the Weibull model. As shown, the curves are plotted in relation to flight hours 304 and reliability probability 306. As shown in FIG. 4, the part life prediction control unit 106 determines that a particular part has served 90% of life at 6150 flight hours at point A, based on the CDF curve 302. Similarly, the part life prediction control unit 106 determines that the particular part has a 10% reliability probability at point B. Based on one or both of the curves 300 and 302, an operator may decide to replace the part at a particular time, depending on a predetermined probability that the part will continue to be reliable.

As another example, the part life prediction control unit 106 may determine a remaining life of a part through use of the exponential model, as shown below:

$$\text{Probability distribution function } (pdf): f(t) = \begin{cases} \lambda * e^{-\lambda t} & t \geq 0 \\ 0 & t < 0 \end{cases}$$

in which the failure rate, $h=\lambda$ is a constant failure rate.

$$\text{Cumulative Distribution Function } (CDF): F(t) = \begin{cases} 1 - e^{-\lambda t} & t \geq 0 \\ 0 & t < 0 \end{cases}$$

Further, a survival function/reliability function, R(t), is given as $R(t)=e^{-\lambda t}$.

As another example, the part life prediction control unit 106 may determine a remaining life of a part through use of a gamma model, as shown below.

$$\text{Probability distribution function } (pdf): f(t) = \frac{\beta^\alpha t^{\alpha-1} e^{-t\beta}}{\Gamma(\alpha)}$$

-continued

Failure rate: $\frac{f(t)}{R(t)}$

Cumulative Distribution Function (CDF): $F(T) = \int_0^T f(t)dt$

Reliability, $R(t)$, is given as $R(t) = 1 - F(t)$.

As another example, the part life prediction control unit 106 may determine a remaining life of a part through use of a log normal model, as shown below.

Probability distribution function (pdf): $f(t) =$ $$\frac{1}{\sigma t \sqrt{2\pi}} e^{-\frac{1}{2\sigma^2}(\ln(t) - \ln(T_{50}))^2}$$

where $T_{50} = e^\mu$

Failure rate: $\frac{f(t)}{R(t)}$

CDF: $F(T) = \int_0^T \frac{1}{\sigma t \sqrt{2\pi}} e^{-\frac{1}{2\sigma^2}(\ln(t) - \ln(T_{50}))^2} dt$ Reliability, $R(t) = 1 - F(t)$.

The part life prediction control unit 106 may determine remaining life of a part through one or more of the mathematic models shown above. Optionally, the part life prediction control unit 106 may determine remaining life of a part through various other mathematical models, formulas, and the like. For example, the part life prediction control unit 106 may determine remaining life through an average, mean, statistical parameter(s), or the like of a particular type of part, as determined through data compiled for thousands, if not millions, of like parts.

Certain parts of an aircraft may be associated with flight hours or flight cycles. For example, landing gear parts are typically associated with cycles instead of hours. As such, part life distributions and predictions for parts associated with cycles are determined in relation to cycles, and not flight hours. Conversely, part life distributions and predictions for parts associated with flight hours are determined in relation to hours, and not flight cycles.

As described herein, embodiments of the present disclosure provide part reliability determination systems and methods that may integrate data sources and estimate TSI and/or CSI from both removed parts and parts that are still on aircraft.

As described above, embodiments of the present disclosure provide systems and methods for efficiently analyzing data to determine the remaining life of various parts of a vehicle, such as an aircraft. Embodiments of the present disclosure provide systems and methods that efficiently analyze data to determine remaining life of one or more parts.

Embodiments of the present disclosure provide systems and methods that allow large amounts of data to be quickly and efficiently analyzed by a computing device. For example, an aircraft includes millions of component parts, each of which has a useful life before potentially failing. The vast amounts of data are efficiently organized and/or analyzed by the part reliability determination systems and methods, as described above. The systems and methods analyze the data in a relatively short time so that remaining useful life for each part may be determined. A human being would be incapable of analyzing such vast amounts of data in such a short time. As such, embodiments of the present disclosure provide increased and efficient functionality, and vastly superior performance in relation to a human being analyzing the immense amounts of data. In short, embodiments of the present disclosure provide systems and methods that are configured to generate and analyze millions of calculations and computations that a human being is incapable of efficiently, effectively and accurately managing.

As described herein, embodiments of the present disclosure provide systems and methods of assessing reliability of parts of a vehicle, such as an aircraft. Embodiments of the present disclosure provide systems and methods of determining a remaining life of various parts of an aircraft. Also, embodiments of the present disclosure provide systems and methods of determining times to replace parts of an aircraft in order to avoid flight delays that would otherwise occur due to maintenance operations between flights.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A part reliability determination system that is configured to determine a reliability of at least one part of a vehicle, the part reliability determination system comprising:
    a part life distribution control unit that determines a part life distribution related to the at least one part, wherein the part life distribution related to the at least one part is based on historical part data for prior parts of a same type as the at least one part that have been previously used with respect to the vehicle and at least one other vehicle; and
    a part life prediction control unit that determines a remaining life of the at least one part based on current life data of the at least one part in relation to the part life distribution related to the at least one part.

2. The system of claim 1, further comprising a parts database in communication with the part life prediction control unit, wherein the current life data of the at least one part is stored in the parts database, and wherein the historical part data is stored in the parts database.

3. The system of claim 1, further comprising a vehicle usage database that stores vehicle usage data regarding actual use of the vehicle, wherein the part life prediction control unit determines the remaining life in relation to the vehicle usage data.

4. The system of claim 1, wherein the current life data includes one or both of time since installation or cycles since installation.

5. The system of claim 1, wherein the part life prediction control unit determines the remaining life based, at least in part, on a prior replacement time of at least one prior part.

6. The system of claim 1, wherein the part life distribution control unit builds a chain of part installation times and part removal times, and wherein the part life distribution control unit uses the chain to determine the remaining life of the at least one part.

7. The system of claim 1, wherein the part life prediction control unit analyzes vehicle configuration data to determine presence and number of the at least one part.

8. The system of claim 1, wherein the part life prediction control unit determines a time since installation or a cycles since installation for the at least one part based, at least in part, on a part number or serial number of the at least one part.

9. The system of claim 1, wherein the part life prediction control unit determines the remaining life of the at least one part through a determination of one or both of a time the since the at least one part was installed or cycles since the at least one part was installed in relation to one or more mathematical models.

10. A part reliability determination method that is configured to determine a reliability of at least one part of a vehicle, the part reliability determination method comprising:
    using a part life distribution control unit to determine a part life distribution related to the at least one part, wherein the using the part life distribution control unit comprises basing the part life distribution related to the at least one part on historical part data for prior parts of a same type as the at least one part that have been previously used with respect to the vehicle and at least one other vehicle; and
    determining, by a part life prediction control unit, a remaining life of the at least one part based on current life data of the at least one part in relation to the part life distribution related to the at least one part.

11. The method of claim 10, further comprising:
    communicatively coupling a parts database with the part life prediction control unit;
    storing the current life data of the at least one part in the parts database; and
    storing the historical part data in the parts database.

12. The method of claim 10, further comprising storing vehicle usage data regarding actual use of the vehicle, and wherein the determining comprises determining the remaining life of the at least one part in relation to the to the vehicle usage data.

13. The method of claim 10, wherein the determining comprises determining the remaining life based, at least in part, on a prior replacement time of at least one prior part.

14. The method of claim 10, further comprising building a chain of part installation times and part removal times, and wherein the determining comprises using the chain to determine the remaining life of the at least one part.

15. The method of claim 10, further comprising analyzing, by the part life prediction control unit, vehicle configuration data to determine presence and number of the at least one part.

16. The method of claim 10, wherein the determining comprises determining a time since installation or a cycles since installation for the at least one part based, at least in part, on a part number or serial number of the at least one part.

17. The method of claim 10, wherein the determining comprises determining one or both of a time since the at least one part was installed or cycles since the at least one part was installed in relation to one or more mathematical models.

18. A part reliability determination system that is configured to determine a reliability of at least one part of a vehicle, the part reliability determination system comprising:
    a vehicle usage database that stores vehicle usage data regarding actual use of the vehicle;
    a part life distribution control unit that determines a part life distribution related to the at least one part, wherein the part life distribution related to the at least one part is based on historical part data for prior parts of a same type as the at least one part that have been previously used with respect to the vehicle and at least one other vehicle, wherein the part life distribution control unit determines an average useful life for a representative part that is the same type as the prior parts and the at least one part;
    a part life prediction control unit that determines a remaining life of the at least one part based on current life data of the at least one part in relation to the part life distribution related to the at least one part and the vehicle usage data, wherein the current life data includes one or both of time since installation or cycles since installation; and
    a parts database in communication with the part life distribution control unit and the part life prediction control unit, wherein the current life data of the at least one part is stored in the parts database, and wherein the historical part data regarding the at least one part is stored in the parts database.

19. The system of claim 1, wherein the part life distribution control unit determines an average useful life for a representative part that is the same type as the prior parts and the at least one part.

20. The method of claim 10, wherein the using the part life distribution control unit further comprises determining an average useful life for a representative part that is the same type as the prior parts and the at least one part.

* * * * *